(12) United States Patent
Sica

(10) Patent No.: US 12,650,288 B2
(45) Date of Patent: Jun. 9, 2026

(54) TAPE MEASURING STRAP WITH CUSTOM MARKINGS SHOWING THE POSITIONING OF VARIOUS COMPONENTS FOR CONSTRUCTION APPLICATION

(71) Applicant: PRE FRAMING CORP., Berkeley, CA (US)

(72) Inventor: Mauro Sica, Berkeley, CA (US)

(73) Assignee: Core Envision Inc., Folsom, CA (US)

( * ) Notice: Subject to any disclaimer, the term of this patent is extended or adjusted under 35 U.S.C. 154(b) by 368 days.

(21) Appl. No.: 18/263,251

(22) PCT Filed: Feb. 4, 2022

(86) PCT No.: PCT/EP2022/052735
§ 371 (c)(1),
(2) Date: Jul. 27, 2023

(87) PCT Pub. No.: WO2022/167593
PCT Pub. Date: Aug. 11, 2022

(65) Prior Publication Data
US 2024/0118066 A1     Apr. 11, 2024

(51) Int. Cl.
*G01B 3/10*     (2020.01)
*E04G 21/18*     (2006.01)
(Continued)

(52) U.S. Cl.
CPC ....... *G01B 3/1004* (2020.01); *E04G 21/1841* (2013.01); *G01B 3/02* (2013.01); *G01B 2003/1058* (2013.01)

(58) Field of Classification Search
CPC ................ G01B 3/1003; G01B 3/1004; G01B 2003/1093
(Continued)

(56) References Cited

U.S. PATENT DOCUMENTS

| | | | |
|---|---|---|---|
| 676,628 A | 6/1901 | Merrill et al. | |
| 4,149,320 A | 4/1979 | Troyer et al. | |

(Continued)

FOREIGN PATENT DOCUMENTS

| | | |
|---|---|---|
| GB | 2551522 A | 12/2017 |

OTHER PUBLICATIONS

International search report and written opinion issued by the EPO on Apr. 26, 2022 for PCT/EP2022/052735.

*Primary Examiner* — George B Bennett

(57)     ABSTRACT

In the construction of a building at least part of the information about the fabrication of the building, including what construction elements are to be used in the building and their location for carrying out said construction, is input in a computer software program to generate a plurality of marking information; said marking information is printed on a tape or strap, e.g. using a CNC printing machinery and the printed tape or strap is affixed or connected to a corresponding construction component to be used in said building. The markings may include the position of at least one of: beginning and/or end of a construction element; a cutting location for the cutting of a construction element; an anchor holder; nails or bolts for positioning string lines; plumbing drains; pipes; window assemblies; door headers; studs, posts and cripple studs; joists or rafters; chalk lines; plywood sheating.

21 Claims, 8 Drawing Sheets

(51) Int. Cl.
    *G01B 3/02*         (2020.01)
    *G01B 3/1003*      (2020.01)

(58) Field of Classification Search
    USPC ...... 33/1 G, 489, 493, 494, 679.1, 758, 759,
                            33/771
    See application file for complete search history.

(56) References Cited

U.S. PATENT DOCUMENTS

| | | | | |
|---|---|---|---|---|
| 4,301,596 A | * | 11/1981 | Sedlock | G01B 3/02 |
| | | | | 33/494 |
| 4,367,590 A | * | 1/1983 | Winter | G01B 3/02 |
| | | | | 33/562 |
| 4,845,858 A | * | 7/1989 | Thomas | E04G 21/1891 |
| | | | | 33/759 |
| 6,115,926 A | | 9/2000 | Robell | |
| 6,145,215 A | * | 11/2000 | Graston | G01B 3/004 |
| | | | | 33/759 |
| 6,360,448 B1 | * | 3/2002 | Smyj | E04G 21/1891 |
| | | | | 33/562 |
| 6,523,275 B2 | * | 2/2003 | Medford | E04D 15/025 |
| | | | | 33/759 |
| 6,772,532 B1 | * | 8/2004 | Honea | G01B 3/1004 |
| | | | | 33/759 |
| 7,533,473 B2 | * | 5/2009 | Chua | E04G 21/1891 |
| | | | | 33/759 |
| 7,644,510 B2 | * | 1/2010 | Gingerella | G01B 3/10 |
| | | | | 33/759 |
| 11,002,011 B2 | * | 5/2021 | Small | G01B 3/04 |
| 2001/0013178 A1 | | 8/2001 | Lafrance | |
| 2002/0038518 A1 | * | 4/2002 | Barrows | E04G 21/1891 |
| | | | | 33/758 |
| 2005/0257393 A1 | * | 11/2005 | Spanski | G01B 3/1004 |
| | | | | 33/758 |
| 2008/0052941 A1 | * | 3/2008 | Nyberg | B25H 7/00 |
| | | | | 33/566 |
| 2009/0188124 A1 | * | 7/2009 | Chua | E04G 21/1891 |
| | | | | 33/563 |
| 2009/0277031 A1 | | 11/2009 | Stocking | |
| 2019/0162514 A1 | | 5/2019 | Lemieux | |
| 2020/0080296 A1 | | 3/2020 | Schettine et al. | |
| 2023/0266110 A1 | * | 8/2023 | Hatzopoulos | G01B 3/006 |
| | | | | 33/758 |

* cited by examiner

Fig. 1b                    Fig. 1c

TAPE MEASURING STRAP WITH CUSTOM MARKINGS SHOWING THE POSITIONING OF VARIOUS COMPONENTS FOR CONSTRUCTION APPLICATION

This application is a U.S. national stage of PCT/EP2022/052735 filed on 4 Feb. 2022, which claims priority to and the benefit of U.S. Provisional Application No. 63/146,141 filed on 5 Feb. 2021 the contents of which are incorporated herein by reference in their entireties.

FILED OF INVENTION

The present invention relates to a tape measuring strap with custom markings created by a software CAD program coupled with a CNC machinery, showing the positioning of various components, particularly for construction application.

BACKGROUND

A large number of plumbing drains and anchoring bolts need to be precisely embedded into the foundation concrete. The accurate positioning is currently done by reading the blueprints and measuring with various measuring devices in difficult outdoor conditions. For instance, laser tape measuring devices are hard to see outdoor. Therefore, the traditional tape measure is currently the most used tool for this delicate job. Whenever errors occur, they are usually discovered after the concrete is set, making corrections quite challenging, involving the jackhammering of the concrete.

Another problem is that wood construction involves the cut at length, either off-site or on-site, of structural beams to use as window and door headers and other structural components like, for instance, floor systems. Dozens of short beams are cut out of longer beams with the same length, for example, 12' or 16' long, according to the beam material.

It is challenging and time-consuming to use the material efficiently, so, often, the crew ends up scrapping a large quantity of expensive beam material (i.e., LSL), losing hundreds of dollars. Additionally, in wood framing construction, whenever the wall framing components are pre-cut inside an off-site factory and assembled on-site, the wood plates are custom marked with printing machinery coupled with a software program, directly onto the dimensional lumber, which, being a natural material with plenty of defects, such as missing edges and knots, can be difficult to read. Additionally, the lumber in contact with the concrete slab needs to be pressure treated with wood preservatives, a treatment that renders the surface very dark. These conditions make the markings difficult to read and greatly limit any ability to add additional useful notes.

The present invention aims at solving the above problems with a device according to claim 1 and a process according to claim 10.

Preferred embodiments are recited in the dependent claims.

In an embodiment, the tape measuring strap with custom markings for construction application, said markings providing information that may include the position of at least one of item such as beginning and/or end of a construction element; a cutting mark for cutting to length a construction element; or including the location of a construction element such as an anchor holder; nails or bolts for positioning string lines; plumbing drains; pipes; window assemblies; door headers; studs, posts and cripple studs; joists or rafters, chalk lines for interior wall layout, plywood sheathing.

In an embodiment, the tape measuring strap is affixed to a construction component. Typically, said construction component is a wooden beam of standard commercial length before it is cut to the required length and said strap contains at least one cutting mark to provide a location for the operator on where to cut the beam without having to measure it himself. Mistakes are thus avoided or greatly reduced.

In another embodiment, the construction component is a foundation form or a subfloor. In an embodiment, the tape is further comprising identification numbers or letters or bill of materials for identifying e construction element, e.g. the construction component to which it is going to be affixed or connected.

The tape is preferably in the form of a coil and is made of a flexible material selected from fiberglass, aluminium, steel. Preferably the tape measuring strap is less than 0.2 mm thick. According to an embodiment, the method of the invention for building a structure, includes providing a construction element with information about the fabrication of the building components, said information including markings for carrying out said construction method, said markings including the position of at least one of: beginning and/or end of a construction element; a cutting location for the cutting of a construction element; an anchor holder; nails or bolts for positioning string lines; plumbing drains; pipes; window assemblies; door headers; studs, posts and cripple studs; joists or rafters; chalk lines; plywood sheating, comprising the steps of inputting information and generating said information in a computer software program, generating a plurality of markings information and accurately printing said marking information on a tape or strap using a CNC (computer numerical control) machinery, and affixing said tape or strap to a construction component to be used in said building making.

In an embodiment, said construction element is an element suitable to be cut or severed, e.g. a beam, which may be selected from wood, plastic and other severable material; the method provides for a step of cutting the said component, preferably including cutting the affixed strap together with the component, according to the markings provided on said strap.

According to an embodiment in which the construction element is part of a building foundation or subfloor, the strap is located, e.g. affixed, to the frame (i.e. the form, typically a wooden form) of a foundation and the method includes the step of affixing further construction components to said foundation form in locations provided and identified by the markings present on said strap. Exemplary construction components in this embodiment are selected from anchor holders, bolts, plumbing or electric pipes, plumbing drains, nails to use for mason string lines.

In an embodiment, the method comprises the steps of providing a foundation perimeter form, formed by construction elements that are equipped with said strap, providing a plurality of additional construction components according to the markings present onto said strap and pouring concrete within said form to make a foundation that will include said additional construction components embedded at the locations identified by the strap within said concrete of the foundation.

BRIEF DESCRIPTION OF THE DRAWINGS

FIG. 1*a*,1*b*,1*c* show a strap according to the invention with custom markings generated by a computer software system able to optimize the cut at length of multiple beams of standard length.

DETAILED DESCRIPTION

Various embodiments disclosed herein relate to a strap with computer generated, preferably CNC (computer numerical control)-generated custom markings, aiding the accurate positioning of various components.

One exemplary embodiment of the invention device relates to construction applications, and it can comprise a thin metal, fiberglass, or plastic strap in coil form (e.g. 2.5 cm wide. 0.15 mm thick) with custom marks spaced according to the input of a CAD software to provide required information on the building process and on construction elements, e.g. their length or location. The present invention generally relates to a strap with CNC-generated custom markings aiding the accurate positioning of various components, with the positioning data sourced from a computer-aided design or drafting (CAD) systems connected to an apparatus able to precisely print marks on a continuous coil of material (e.g. plastic, fiberglass, aluminum or steel coil, typically 2.5 cm wide, 0.15 mm thick), spacing the above-mentioned marking with high accuracy (i.e., +−¹⁄₁₆″ every 30 ft).

The strap is in the form of a tape provided with custom markings for construction application, said markings including the position of at least one of: beginning and/or end of a construction element; a cutting location for the cutting of a construction element; an anchor holder; nails or bolts for positioning string lines; plumbing drains; pipes; window assemblies; door headers; studs, posts and cripple studs; chalk lines, plywood sheating.

In one embodiment of the invention, the strap can be used for construction application, particularly residential wooden construction, in several different sub-applications as here below discussed.

Figure 1A:
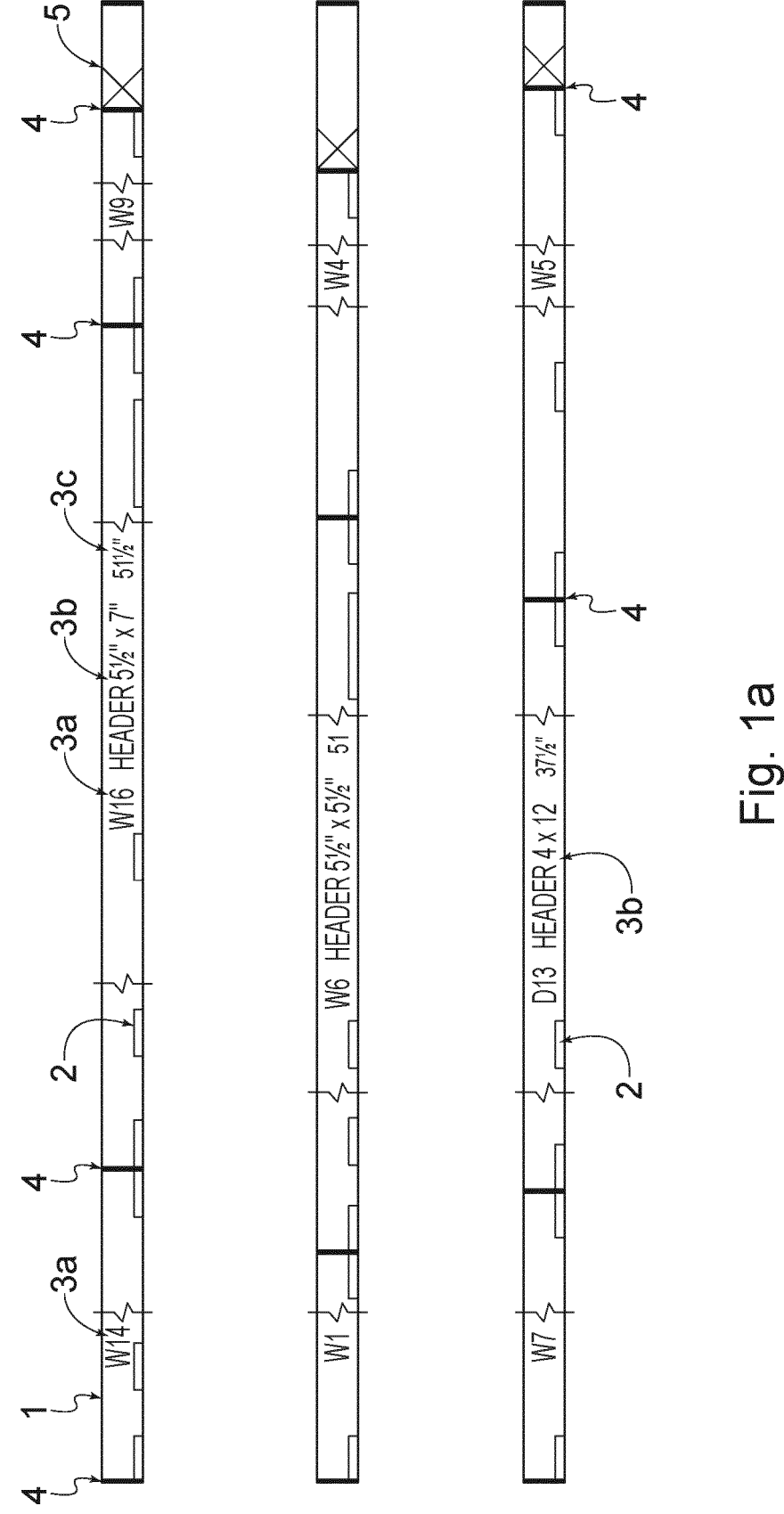

FIG. 1a,1b,1c show three examples of a strap 1 with custom markings generated by a computer software system in order to optimize the cut at length, along the cutting lines 4, of multiple custom beams, starting from a beam of standard length 50 (i.e., 12′ long), while marking windows or door header identifiers 3b, window or door numbers 3a, header lengths 3c, and top cripple studs positions 2 on the same strap. The cross marks 5 identifies the part to scrap. The straps are to be fastened on the edge of the beams of standard length 50 prior to cut them at length.

Figure 2:
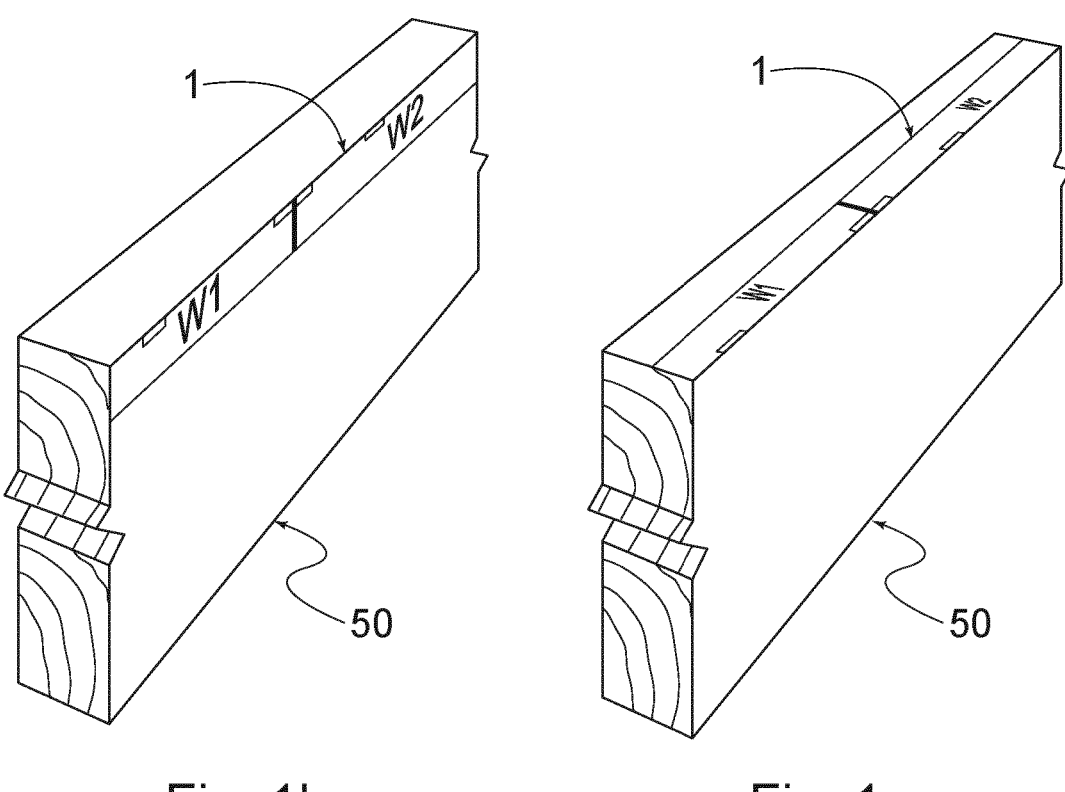
FIG. 2 shows "anchor holders," which are an off-the-shelf product designed to hold in place either anchor bolts or hold-down bolts to embed into the concrete foundation.
Figure 2:
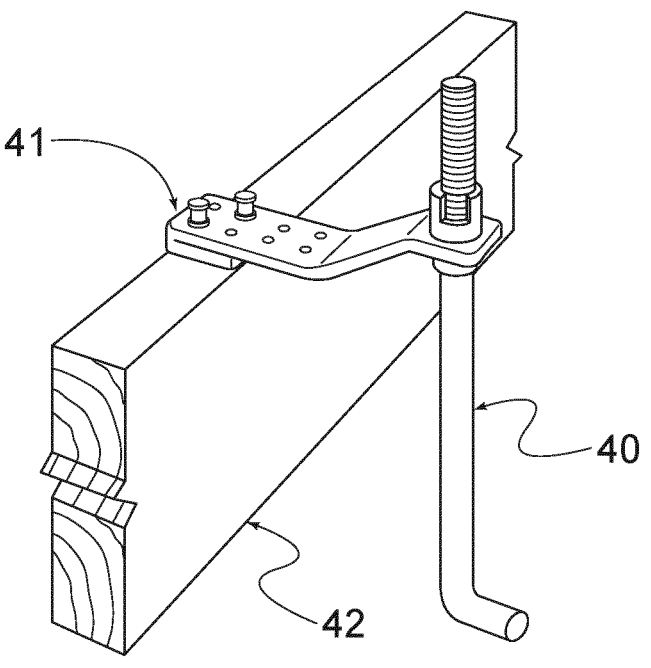
Figure 4:
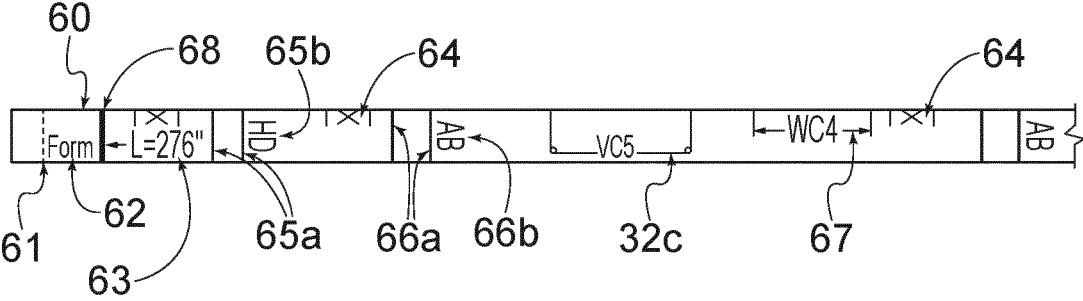
FIG. 4 shows a strap with CNC-generated custom markings for precise positioning of "anchor holders."

FIG. 4 shows a strap with CNC-generated custom markings for precise positioning of "anchor holders" 41 (FIG. 2), which are an off-the-shelf product shaped to hold in place either anchor bolts 40 or hold down bolts 40 (FIG. 2), to embed into the concrete foundation, to fasten on the wooden foundation form 42. FIG. 4 shows an example of a strap with marking for hold-downs 65b composed by two lines 65a spaced apart according to the width of the "anchor holders" 41 (i.e., 1¼%), and marking for anchor bolts 66b composed by two lines 66a spaced apart according to the width of the "anchor holders" 41. The straps are to be fastened on the edge of the wooden form 30 prior to the concrete pouring.

Figure 3:
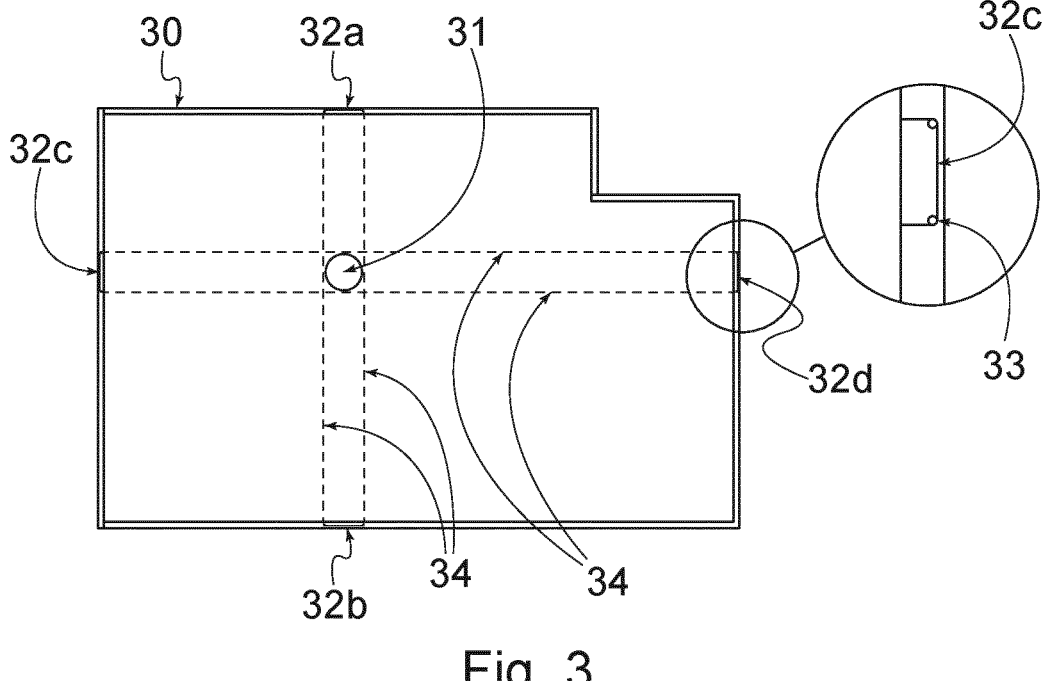
FIG. 3 shows a set of perimeter straps with custom markings to localize precisely components at any point inside a perimeter, being said perimeter the edge of a foundation form or a subfloor.

FIGS. 3 and 4 shows a set of perimeter straps with CNC-generated custom markings to precisely localize components 31 at any point inside a perimeter, in this example being the perimeter a foundation form 30 or a subfloor, using four marks 32a,b,c,d, where each mark pinpoints at least one point, in this embodiment two points, for a total of four marks and eight points, being those points used to drive, into circular marks 33, the supporting nails onto the wooden foundation form 30, being said nails used for holding two or four string lines 34 to be tensioned between the nails. The four string lines will create an intersecting area that precisely pinpoints the position of the component 31, for instance, a plumbing drain or electrical pipe, that will need to be embedded into the concrete. In operation, the straps are to be fastened on the edge of the wooden form 30 prior to the concrete pouring.

FIG. 4 shows a strap with CNC-generated custom markings of plumbing drains 67 localized close-by to the foundation edge 30 (in the example a WC drain) or drains localized in the middle of the foundation (32c) as previously mentioned, or electrical pipes. Additionally, it is beneficial to include marking indicating the position of studs, posts, and cripple studs 64 (composed by two lines and a cross symbol) localized nearby the drains, in order to ensure the plumber will position the ventilation pipes (which need to reach the roof) between the studs and not where a stud will be later positioned. The length 63 of the foundation edge where the straps need to be fastened can also be included, together with a clear indication of where the strap starts (line 68), an additional dashed line 61 indicating the form edge, and a writing 62, showing precisely where the form needs to be located. This strap needs to be fastened on the wooden foundation form 30 prior to the concrete pouring or on the edge of the subfloor.

Figure 6:
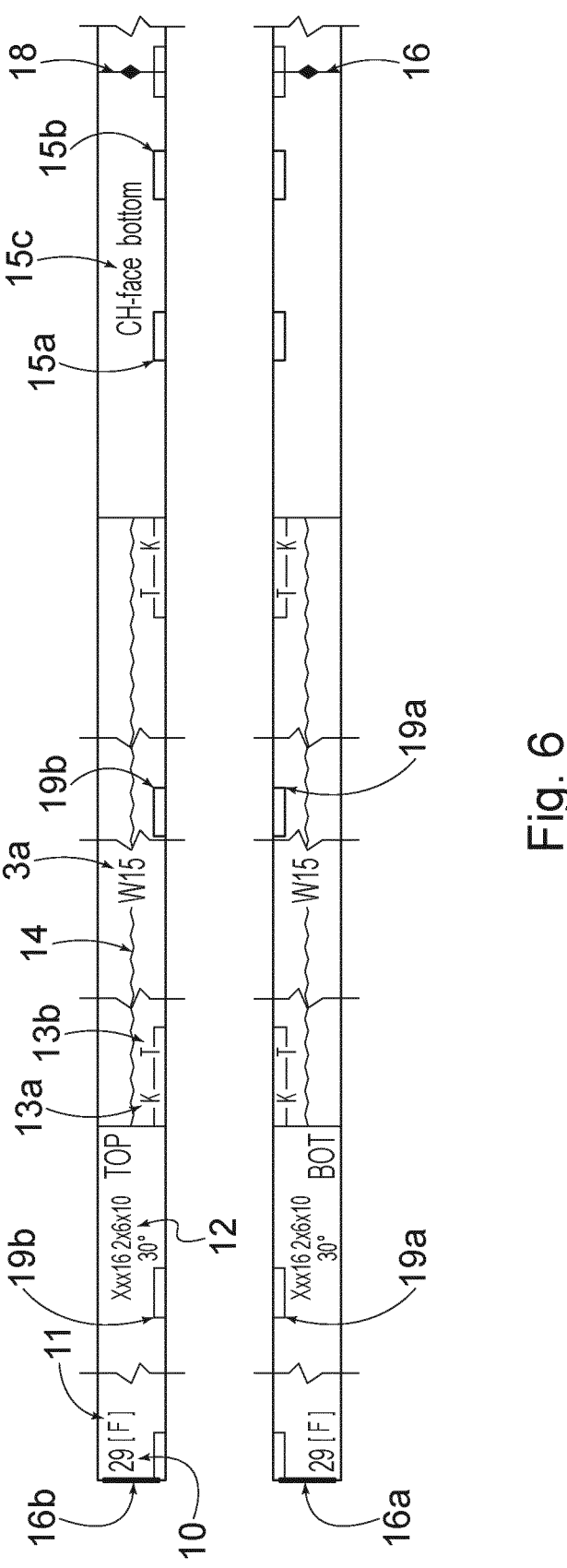
FIG. 6 shows a set of two straps with CNC-generated custom markings indicating stud, posts, cripples' position, pre-assembled components location, wall number, construction stage letters, channels position, and plywood joint marking.

FIG. 6 shows a set of two straps 16a and 16b (to fasten onto bottom and top plates) with CNC-generated custom markings for stud layout positioning, the indication of the bill of quantity 12 for each wall, and position (14)+identifier (3a) of prefabricated or pre-assembled components, such as windows and doors (in the example the position is marked with a zig-zag line 14). This strap needs to be fastened on the top and bottom plates.

FIG. 6 shows the same set of two straps 16a and 16b with CNC-generated custom markings of "channels" 15a and 15b (a group of 3 studs nailed in a U-shaped configuration located at each T-intersection of different walls) with writing 15c indicating the position (top or bottom) of the central stud at the time the wall is assembled on the floor (prior to being erected in vertical position). This strap needs to be fastened onto the top and bottom plates.

FIG. 6 shows the same set of two straps 16*a* and 16*b* with CNC-generated custom markings indicating wall number 10 and construction stages 11, where the wall number is progressive and generated by a computer software system able to determine the construction sequence, and the stage number 11 is a letter sorted alphabetically, also generated by the same computer software system, where said stage letter indicates the group of walls that can be built on the subfloor or slab, followed by the erection of those group of walls, which frees the space on the subfloor or slab, so a new group of walls can subsequently be built and then erected, and so on.

Figure 5:
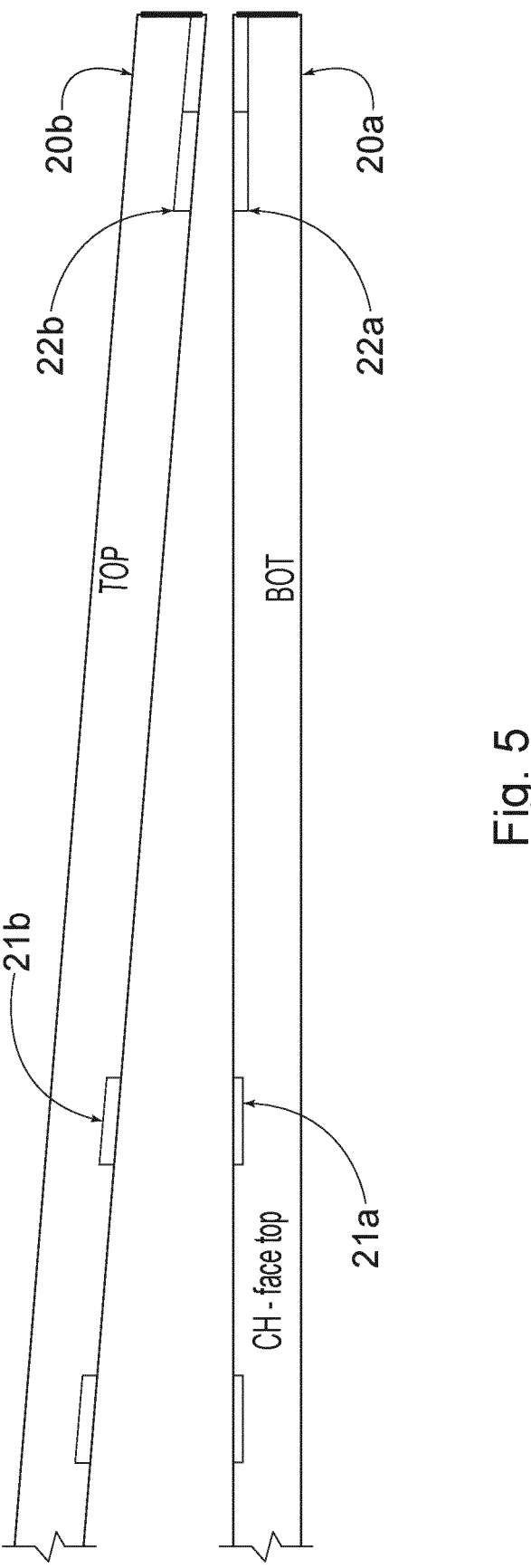
FIG. 5 shows a set of two straps with CNC-generated custom markings indicating the stud position of gable or rack walls.

FIG. 5 shows a set of two straps 20*a* and 20*b*, with CNC-generated custom markings indicating the stud position of gable or rack walls (triangular portions of a wall between the edges of single or intersecting roof pitches). Because the top plate 20*b* of the wall is oriented with an angle, the marks 21*b* and 22*b*, for example, are spaced with a wider interval than the marks 21*a* and 22*a* on the bottom plate 20*a*, depending on the pitch of the top plate, which can be complexed to calculate manually. This embodiment of the invention delegates this calculation to a computer and a CNC system. This strap needs to be fastened on the wall framing top and bottom plates of a rack or gable wall.

Figure 7:
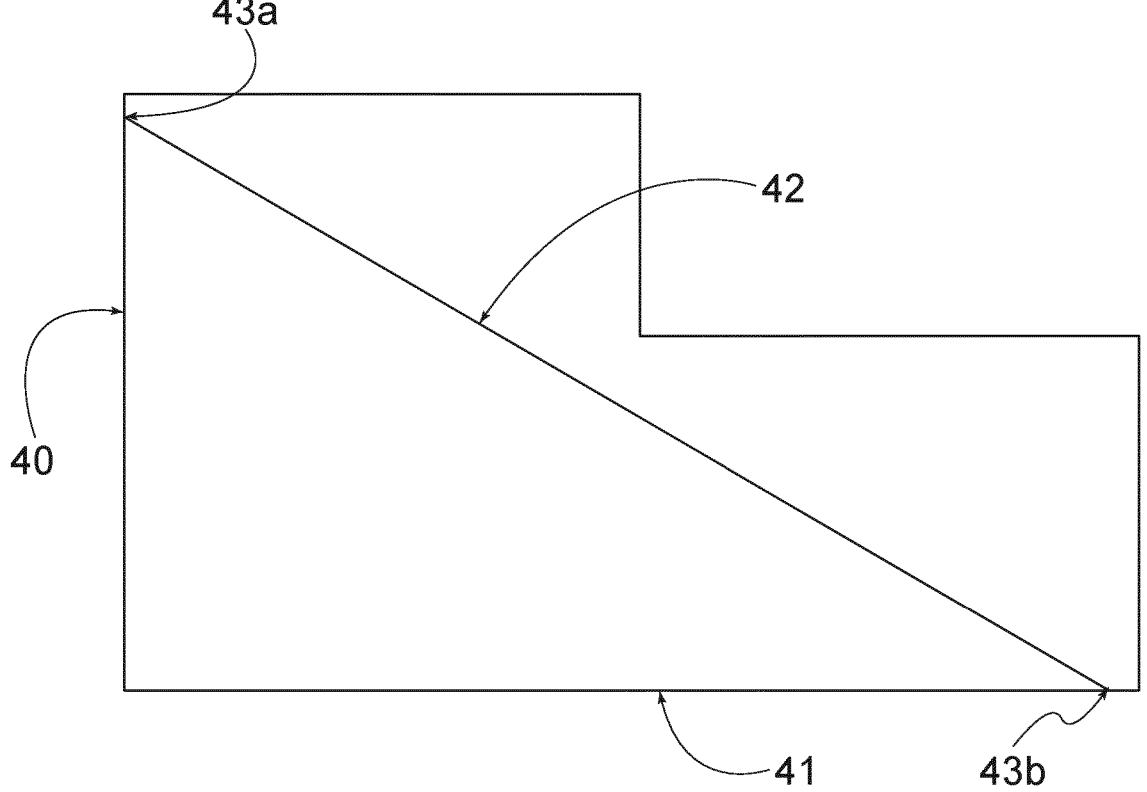
FIG. 7 shows a strap with CNC-generated custom markings indicating the diagonal length, useful to square at 90 degrees or position at an angle two edges of a foundation form or subfloor system.

FIG. 7 shows a strap 40 and 41 with CNC-generated custom markings 43*a* and 43*b* with the indication of diagonal length 42, useful to square at 90 degrees or position at an angle two edges of the form 40 and 41, avoiding complex manual trigonometric calculations, particularly when the angle needs to be larger or smaller than 90 degrees. This embodiment simplifies and speeds up this operation. In this case, the strap needs to be fastened on the wooden form prior to the concrete pouring into the form itself.

Figure 8:
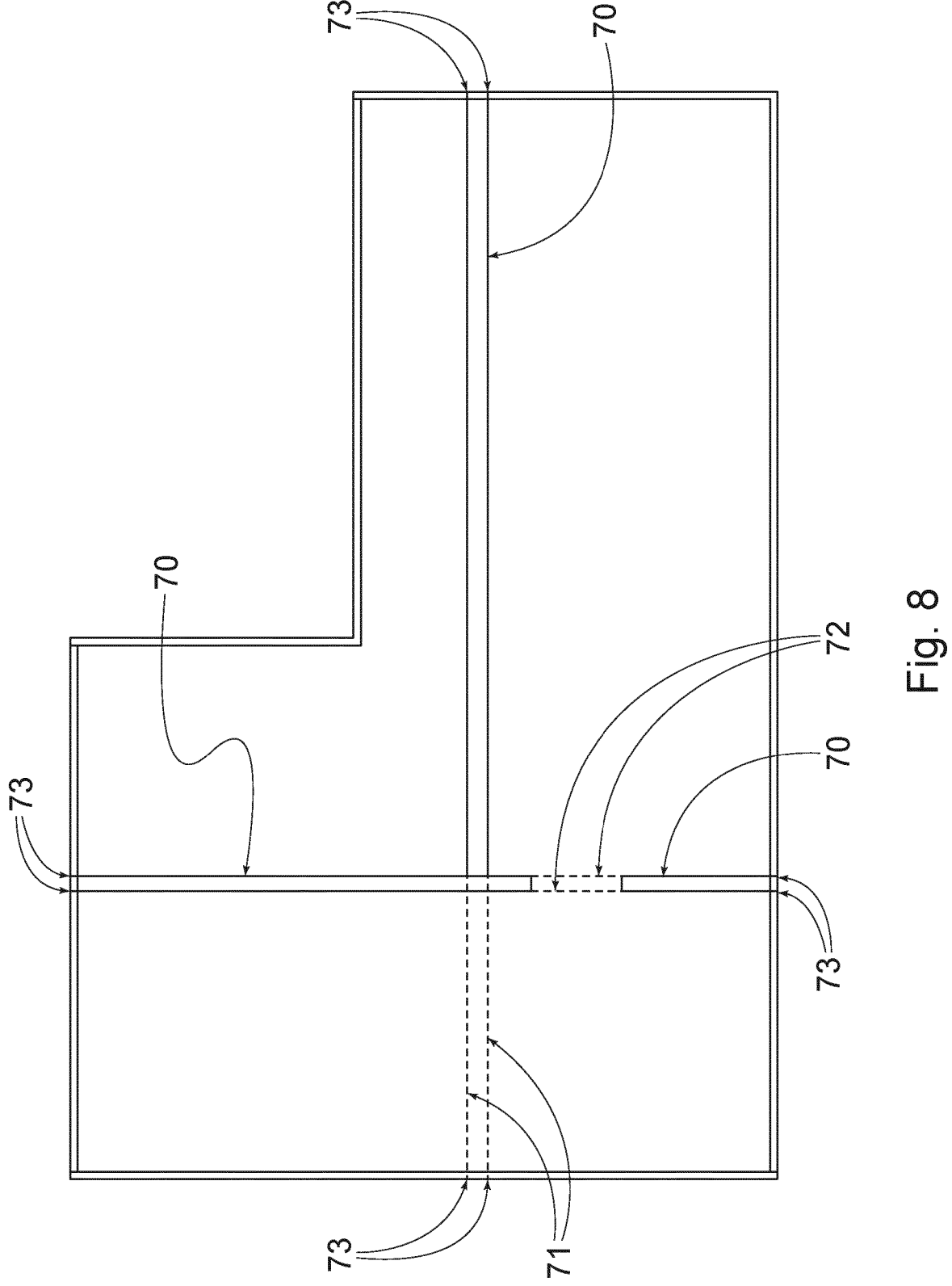
FIG. 8 shows a strap with CNC-generated custom markings aiding the layout of interior walls on the slab or subfloor, using a chalk line.

FIG. 8 shows a strap with CNC-generated custom markings aiding the layout of the interior walls 70 on the slab or subfloor, using a chalk line 71 and 72, being these chalk lines temporarily tensioned between the marking 73, and then "snapped" to mark one, or as shown in the example, both edges of the interior wall plates, where the walls will be subsequently erected. In this case, the strap needs to be fastened on the wooden form or on the finished subfloor. These markings can be included in strap 61 (FIG. 4) in case of a "slab on grade" foundation.

FIG. 6 shows a set of two straps 16*a* and 16*b* with CNC-generated custom markings indicating stud, posts, cripples' position 19*a* and 19*b*, being those markings U-shaped and oriented down (19*b*) in the top plate and up (19*a*) in the bottom plate in order to avoid the possibility to accidentally swap the top and bottom plate during the wall assembly operation, being those markings spaced at a custom distance according to the data calculated by a computer software system. The mark can include the stud type 13*a* and 13*b* (markings of "King" (13*a*) and "Trimmer" (13*b*) studs supporting the header), individual stud length, exterior plywood sheathing joints 18, indicating plywood size and positioning, which is particularly useful for shear walls, where the plywood size needs to be optimized (more than 24" and max 48" according to most building codes).

Figure 9:
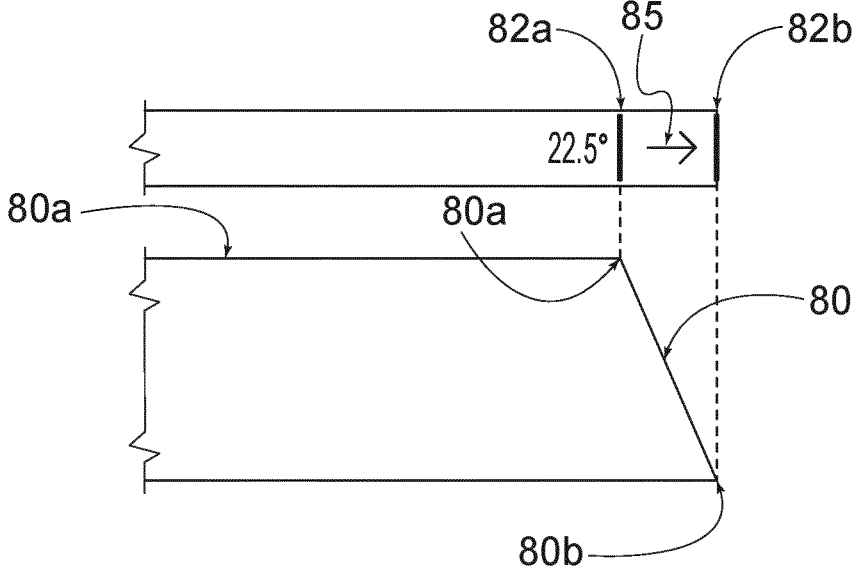
FIG. 9 shows a type of mark to use on the strap, when the lumber needs to be cut at an angle.
Figure 9:
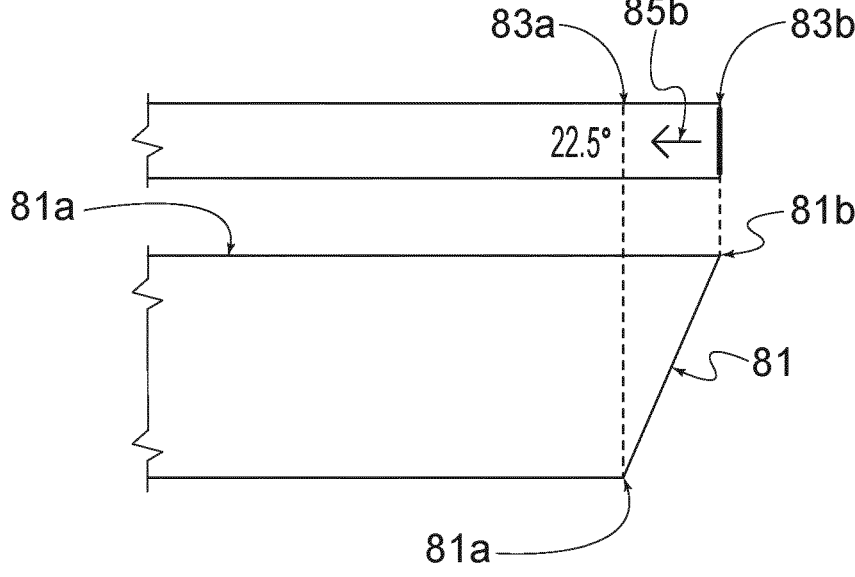

FIG. 9 shows a type of mark to use on the strap when the lumber needs to be cut at an angle. The strap will be applied on the side 80*a* and 81*a*.

In case of an angle of type 80, where from the point of view of the side where the strap is applied both lines are visible, the marks on the strap will be composed by two solid lines 82*a* and 82*b* with an arrow 85 directed toward line 82*b*, showing the cut direction (optionally an angle marking can be added, in the example showing "22.5°").

In case of an angle of type 81, where from the point of view of the side where the strap is applied only one lines is visible, the marks on the strap will be composed by a dashed line 83*a*, and a solid lines 83*b*, with an arrow 85*b* directed toward line 83*a*, showing the cut direction (optionally an angle marking can be added, in the example showing "22.5°").

In case of a very long foundation form or wall, the strap can be fastened as a single piece to a series of sections of shorter length and allow the final cut to be very precise, being the strap in one piece that is fastened to multiple sections and keep a high precision. In other words, possible mistakes in cutting the several sections are avoided.

The invention claimed is:

1. A tape measuring strap with custom markings f construction application, said markings comprising the position of at least one of:
an anchor holder.

2. The tape according to claim 1, wherein said tape measuring strap is adapted to be affixed to a construction component comprising a wooden beam of standard commercial length before it is cut to the required length and said tape measuring strap contains at least one cutting mark.

3. The tape according to claim 1, wherein said tape measuring strap is adapted to be affixed to a construction component comprising a foundation form.

4. The tape according to claim 1, wherein said tape measuring strap is adapted to be affixed to a construction component comprising a subfloor, and further comprising identification numbers or letters or bill of materials for identifying said construction component.

5. A construction method of building a structure that comprises
providing a construction element with information about the fabrication of building components, said information including markings for carrying out said construction method, said markings including the position of at least an anchor holder,
inputting information and generating said information in a computer software program,
generating a plurality of markings information and accurately printing said marking information on a tape or strap using a CNC (computer numerical control) machinery, and
affixing or connecting said tape or strap to a construction component to be used in said building making.

6. The method according to claim 5, wherein said construction component is an element suitable to be cut or severed, selected from wood, plastic and other severable material, the method further comprising
cutting said construction component according to the markings provided on said strap.

7. The method according to claim 5, wherein said construction element is part of a building foundation or subfloor and further comprising affixing at least one further construction component to said foundation form according to the markings provided on said strap, and wherein said further construction component is selected from further anchor holders, bolts, plumbing or electric pipes, plumbing drains, and nails to use for mason string lines.

8. The method according to claim 7, comprising the steps of
providing a foundation perimeter form, formed by construction elements provided with said strap,
providing a plurality of additional construction components according to the markings provided onto said strap and

pouring concrete to make a foundation to include said additional construction components in said foundation.

9. The method according to claim 6, wherein the markings include at least said cutting location for the cutting of said construction element, the step of cutting the component includes cutting the affixed strap, and said cutting of said construction element is an angled cut made at said cutting location.

10. The tape measuring strap according to claim 1, wherein said markings further comprise the position of at least one of:

a beginning and/or end of a construction element;

a cutting mark for cutting to length a construction element;

nails or bolts for positioning string lines;

plumbing drains;

pipes;

window assemblies;

door headers;

studs, posts and cripple studs;

joists or rafters;

chalk lines for interior wall layout;

plywood sheathing; and a part to scrap.

11. The tape measuring strap according to claim 10, wherein said markings include at least one said cutting mark indicating that the construction element requires a cut.

12. The tape measuring strap according to claim 11, wherein said at least one cutting mark comprises a first mark signifying an angled cut of a construction component.

13. The tape measuring strap according to claim 1, wherein said markings further comprise the position of at least one of:

nails or bolts for positioning string lines; and plywood sheathing.

14. The tape measuring strap according to claim 1, wherein said markings comprising the position of an anchor holder comprise two lines spaced apart at a distance corresponding to a width of said anchor holder.

15. The method according to claim 5, wherein said markings further include a position of at least one of: beginning and/or end of a construction element; a cutting location for the cutting of a construction element; nails or bolts for positioning string lines; plumbing drains; pipes; window assemblies; door headers; studs, posts and cripple studs; joists or rafters; chalk lines; plywood sheating; and, a part to scrap.

16. The method according to claim 6, wherein said markings include at least one mark indicating that the construction element requires an angled cut of said construction component.

17. The tape according to claim 3, wherein said foundation form is a wooden foundation form and said markings comprising the position of an anchor holder indicate positions at which said foundation form is to be joined to a concrete foundation via an anchor bolt.

18. A construction method of building a structure comprising:

providing a construction element with information about the fabrication of the building components said information including markings for carrying out said construction method, said markings including the position of at least one of: beginning and/or end of a construction element; a cutting location for the cutting of a construction element; an anchor holder; nails or bolts for positioning string lines; plumbing drains; pipes; window assemblies; door headers; studs, posts and cripple studs; joists or rafters; chalk lines; plywood sheating;

inputting information and generating said information in a computer software program;

generating a plurality of markings information and accurately printing said marking information on a tape or strap using a CNC (computer numerical control) machinery;

affixing or connecting said tape or strap to a construction component to be used in said building making; and cutting said construction component according to the markings provided on said strap.

19. The construction method as in claim 18, wherein said markings comprise at least said cutting location for the cutting of a construction element, said cutting comprises cutting at said cutting location and said cutting comprises making an angled cut.

20. A set of tape measuring straps with custom markings for construction application for precisely localizing components, each of said tape measuring straps adapted to be affixed to a construction component and including a custom marking for a position of a vertical component, a first tape measuring strap of said set of said tape measuring straps adapted to be affixed to an upper construction component and comprising a U-shaped downwardly oriented mark, wherein said U-shaped downwardly oriented mark comprises two vertical side portions and a connecting portion that is substantially parallel to the upper construction component to which said first tape measuring strap is adapted to be affixed, and a second tape measuring strap of said set of said tape measuring straps adapted to be affixed to a lower construction component and comprising a corresponding U-shaped upwardly oriented mark.

21. The set of tape measuring straps with custom markings as in claim 20, wherein said vertical component comprises a post, stud, or cripple stud, said upper construction component is an angled construction component and an open portion of said U-shaped mark is positioned proximate to a bottom edge of said upper construction component to which said vertical component is to be connected, and said second tape measuring strap comprises said corresponding U-shaped upwardly oriented mark positioned proximate to a top edge of said lower construction component to which said vertical component is to be connected.

* * * * *